(12) United States Patent
Chang et al.

(10) Patent No.: US 9,473,880 B2
(45) Date of Patent: Oct. 18, 2016

(54) METHOD AND APPARATUS FOR SWITCHING MODES

(75) Inventors: Woo-yong Chang, Gyeonggi-do (KR); Sun-ae Kim, Seoul (KR); Hyung-rae Cho, Seoul (KR)

(73) Assignee: Samsung Electronics Co., Ltd (KR)

( * ) Notice: Subject to any disclaimer, the term of this patent is extended or adjusted under 35 U.S.C. 154(b) by 1331 days.

(21) Appl. No.: 12/946,586

(22) Filed: Nov. 15, 2010

(65) Prior Publication Data

US 2011/0117902 A1    May 19, 2011

(30) Foreign Application Priority Data

Nov. 13, 2009  (KR) .................. 10-2009-0109448
Nov. 12, 2010  (KR) .................. 10-2010-0112986

(51) Int. Cl.
| | | |
|---|---|---|
| *H04M 3/00* | (2006.01) | |
| *H04W 4/02* | (2009.01) | |
| *H04W 8/24* | (2009.01) | |
| *H04M 1/725* | (2006.01) | |
| *H04W 28/18* | (2009.01) | |
| *H04W 64/00* | (2009.01) | |
| *H04W 88/06* | (2009.01) | |

(52) U.S. Cl.
CPC ........... *H04W 4/02* (2013.01); *H04M 1/72525* (2013.01); *H04W 8/245* (2013.01); *H04W 28/18* (2013.01); *H04W 64/00* (2013.01); *H04W 88/06* (2013.01)

(58) Field of Classification Search
CPC ..... H04W 4/02; H04W 8/245; H04W 28/18; H04W 64/00; H04W 88/06; H04M 1/72525
USPC .............. 455/418, 419, 452.1, 435.1, 456.1, 455/550.1
See application file for complete search history.

(56) References Cited

U.S. PATENT DOCUMENTS

| | | | |
|---|---|---|---|
| 6,636,803 B1 * | 10/2003 | Hartz et al. .................... | 701/459 |
| 8,335,644 B2 * | 12/2012 | Kimura ......................... | 701/414 |
| 2006/0116115 A1 | 6/2006 | Lee | |
| 2009/0005071 A1 * | 1/2009 | Forstall et al. ............ | 455/456.1 |
| 2009/0146846 A1 * | 6/2009 | Grossman ............... | B60R 25/04 340/988 |
| 2009/0149155 A1 * | 6/2009 | Grossman ..................... | 455/411 |
| 2009/0170532 A1 * | 7/2009 | Lee ................... | H04M 1/72566 455/456.3 |
| 2009/0182501 A1 * | 7/2009 | Fyke et al. .................... | 701/208 |
| 2009/0186633 A1 * | 7/2009 | Yonker ............. | H04M 1/72572 455/456.6 |
| 2009/0239508 A1 * | 9/2009 | Waddell ............ | H04M 1/72566 455/414.1 |

FOREIGN PATENT DOCUMENTS

| | | |
|---|---|---|
| EP | 1139684 A1 * | 10/2001 |
| KR | 10-0780278 | * 11/2005 |
| KR | 1020060060901 | 6/2006 |
| KR | 1020060099990 | 9/2006 |
| KR | 1020070052373 | 5/2007 |
| KR | 10-0780278 | 11/2007 |

OTHER PUBLICATIONS

Korean Office Action dated Aug. 19, 2016 issued in counterpart application No. 10-2010-0112986, 11 pages.

* cited by examiner

*Primary Examiner* — Khai M Nguyen

(74) *Attorney, Agent, or Firm* — The Farrell Law Firm, P.C.

(57) ABSTRACT

A method of switching operation modes in a mobile device is provided. The method includes receiving current location information; determining an on-the-map location corresponding to the current location information; extracting a location property of the determined on-the-map location; and setting an operation mode of the mobile device based on the extracted location property.

35 Claims, 7 Drawing Sheets

FIG. 5

| LOCATION PROPERTY | SCHOOL | LIBRARY | CINEMA | CHURCH | DEPARTMENT STORE | PARK | STADIUM |
|---|---|---|---|---|---|---|---|
| OPERATION MODE 1 | VIBRATION MODE | SILENCE MODE | SILENCE MODE | OFF | BELL MODE | CHANGE BACKGROUND | VIBRATION MODE |
| OPERATION MODE 2 | | BRIGHTNESS MIN | BRIGHTNESS MIN | | VOLUMM MAX | BRIGHTNESS MAX | VIBRATION MAX |
| PRIORITY | 4 | 1 | 1 | 5 | 2 | 2 | 3 |

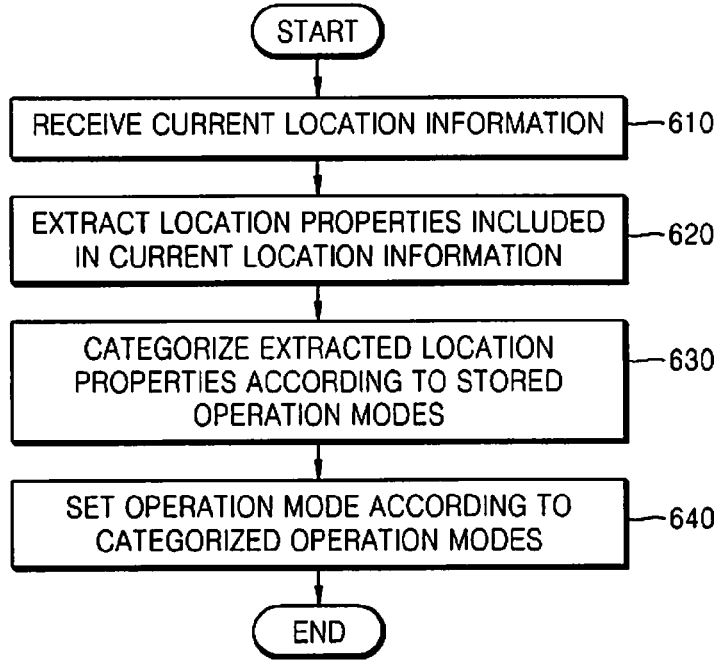
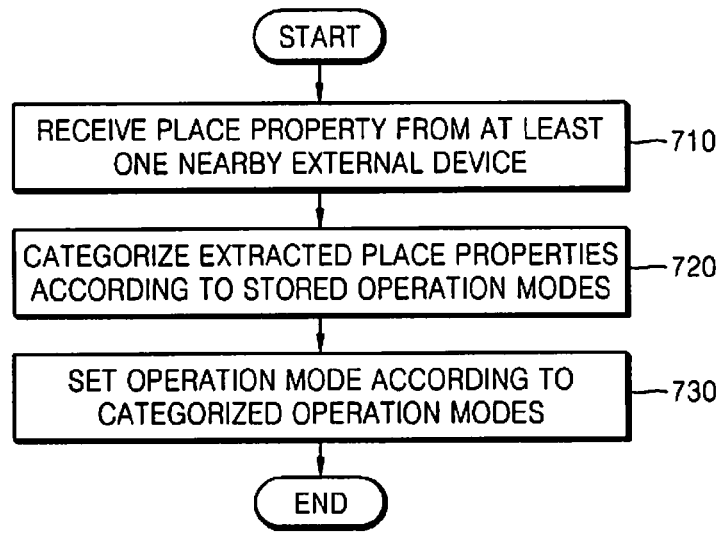

METHOD AND APPARATUS FOR SWITCHING MODES

PRIORITY

This application claims priority under 35 U.S.C. §119(a) to Korean Patent Applications filed in the Korean Intellectual Property Office on Nov. 13, 2009 and Nov. 12, 2010 and assigned Serial Nos. 10-2009-0109448 and 10-2010-0112986, respectively, the entire disclosure of which is incorporated herein by reference.

BACKGROUND OF THE INVENTION

1. Field of the Invention

The present invention relates generally to a method and apparatus for switching operation modes, and more particularly, to a method and apparatus for setting an operation mode according to a location property of a current location information.

2. Description of the Related Art

Due to recent development in communication technologies, various current mobile devices provide information about their current location by receiving signals from a web server or a Global Positioning System (GPS). Furthermore, since a current location of a mobile device may be determined, various services that may be provided at a current location are currently being developed.

SUMMARY OF THE INVENTION

The present invention provides a method and an apparatus for setting operation mode according to a location property of current location information.

According to an aspect of the present invention, a method of switching operation modes is provided. The method includes receiving current location information; determining an on-the-map location corresponding to the current location information; extracting a location property of the determined on-the-map location; and setting an operation mode based on the extracted location property.

According to another aspect of the present invention, a method of switching operation modes is provided. The method includes receiving current location information including location property of a current location; determining an on-the-map location corresponding to the current location information; extracting a location property of the determined on-the-map location; and setting an operation mode based on the extracted location property.

According to another aspect of the present invention, a method of switching operation modes is provided. The method includes receiving a place property from at least one nearby external device; and setting an operation mode based on the received place property.

According to another aspect of the present invention, a mode switching device is provided. The mode switching device includes a receiving unit for receiving current location information; a map matching unit for determining an on-the-map location corresponding to the current location information; a location property extracting unit for extracting a location property of the determined on-the-map location; and an operation mode switching unit for setting an operation mode based on the extracted location property.

According to another aspect of the present invention, a mode switching device is provided. The mode switching device includes a receiving unit for receiving including location property of a current location; a location property extracting unit for extracting a location property of the determined on-the-map location; and an operation mode switching unit for setting an operation mode based on the extracted location property.

According to another aspect of the present invention, a mode switching device is provided. The mode switching device includes a receiving unit for receiving a place property from at least one nearby external device; and an operation mode switching unit for switching operation modes based on the received place property.

BRIEF DESCRIPTION OF THE DRAWINGS

The above and other objects, features and advantages of certain embodiments of the present invention will become more apparent from the following detailed description when taken in conjunction with the accompanying drawings in which:

FIG. 5 is a table related illustrating categorization of operation modes according to an embodiment of the present invention;

FIG. 6 is a flowchart illustrating a method of switching operation modes according to another embodiment of the present invention;

FIG. 7 is a flowchart illustrating a method of switching operation modes according to another embodiment of the present invention;

DETAILED DESCRIPTION OF EMBODIMENTS OF THE PRESENT INVENTION

Figure 1:
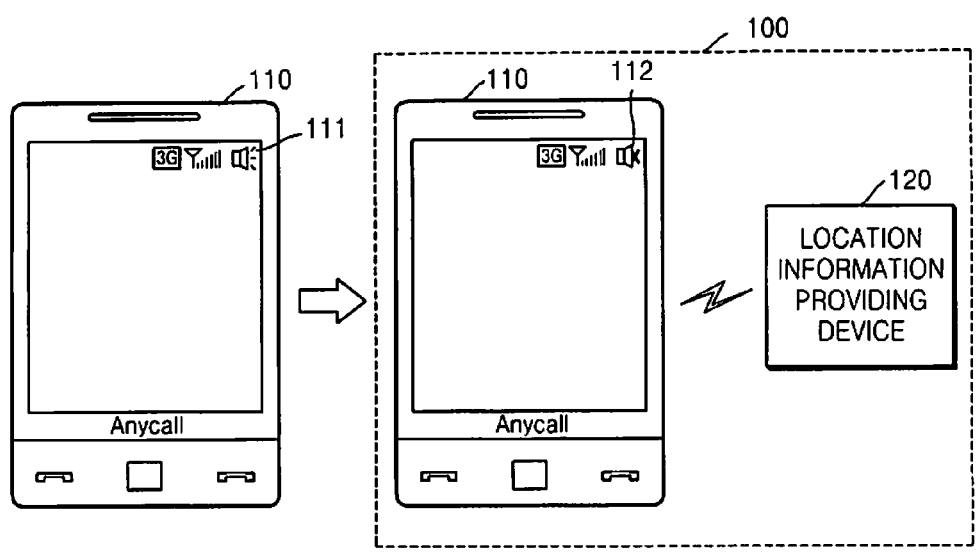
FIG. 1 is a diagram illustrating an example of a method of switching operation modes according to an embodiment of the present invention.

Hereinafter, embodiments of the present invention will be described with reference to the accompanying drawings. In the following description, the same elements will be designated by the same reference numerals when the same elements are shown in different drawings. Further, in the following description of the present invention, a detailed description of known functions and configurations incorporated herein will be omit when it may make the subject matter of the present invention rather unclear.

FIG. 1 is a diagram illustrating an example of a method of switching operation modes according to an embodiment of the present invention.

Referring to FIG. 1, when a mobile device 110, which includes a mode switching device, enters into a predetermined location, the mobile device 100 receives current location information from a predetermined location information providing device 120. Next, the mobile device 110 switches into an operation mode corresponding to a predetermined space 100 that includes the current location. For example, the mobile device 110 may be set to a bell mode and display an icon 111 that indicates the bell mode. When the mobile device 110 enters into the predetermined space 100, the mobile device 110 receives current location information from the location information providing device 120. Upon confirmation that the mobile device 110 has entered the predetermined space 100, the operation mode of the mobile device 110 is automatically switched to a silence mode, and the mobile device 110 displays an icon 112 that indicates the silence mode. The above-described switching of operation modes from the bell mode to the silence mode is merely provided an example. However the present invention is not limited thereto, and other operation mode switches may be performed according to embodiments of the present invention. For example, if a mobile device enters an aircraft, the mobile device may communicate with a predetermined system in the aircraft and the mobile device may automatically turn off as a result of the communication.

Figure 2:
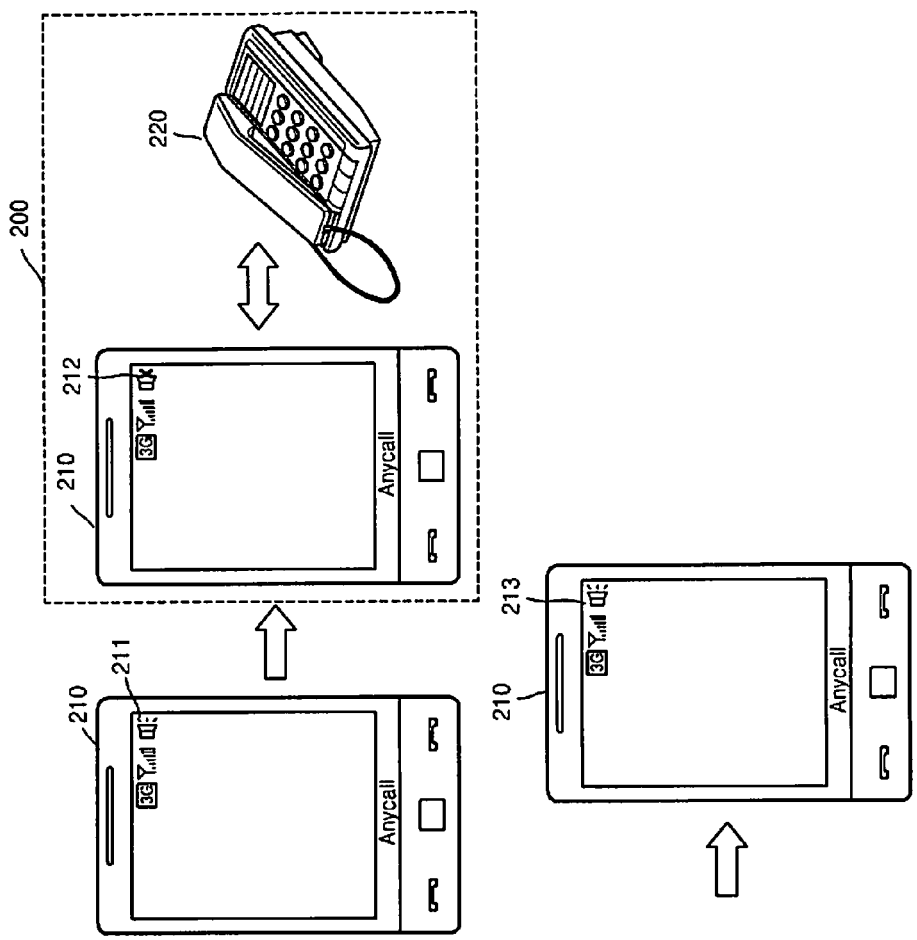
FIG. 2 is a diagram illustrating an example of a method of switching operation modes according to another embodiment of the present invention.

FIG. 2 is a diagram illustrating an example of a method of switching operation modes according to another embodiment of the present invention.

Referring to FIG. 2, a mobile device 210, which includes a mode switching device, is switched to a predetermined operation mode when the mobile device 210 approaches another predetermined device 220. For example, the mobile device 210 may be set to a bell mode and display an icon 211 that indicates the bell mode. When the mobile device 210 enters a predetermined space 200 (e.g., an office room), an approaches another predetermined device 220 (e.g., a phone), such that the mobile device 210 is located within a predetermined distance from the phone 220, the operation mode of the mobile device 210 automatically switches to a silence mode, and the mobile device 210 displays an icon 212 indicating the silence mode.

Next, if a mode switching device is moves beyond the predetermined distance from the other predetermined device, the operation mode of the mode switching device is automatically switched to an original operation mode. For example, referring to FIG. 2, when the mobile device 210 is moves beyond of the predetermined distance from the phone 220, the operation mode of the mobile device 210 is switched back to the original operation mode (i.e., the bell mode), and the mobile device 210 displays an icon 213 that indicates the bell mode.

Figure 3:
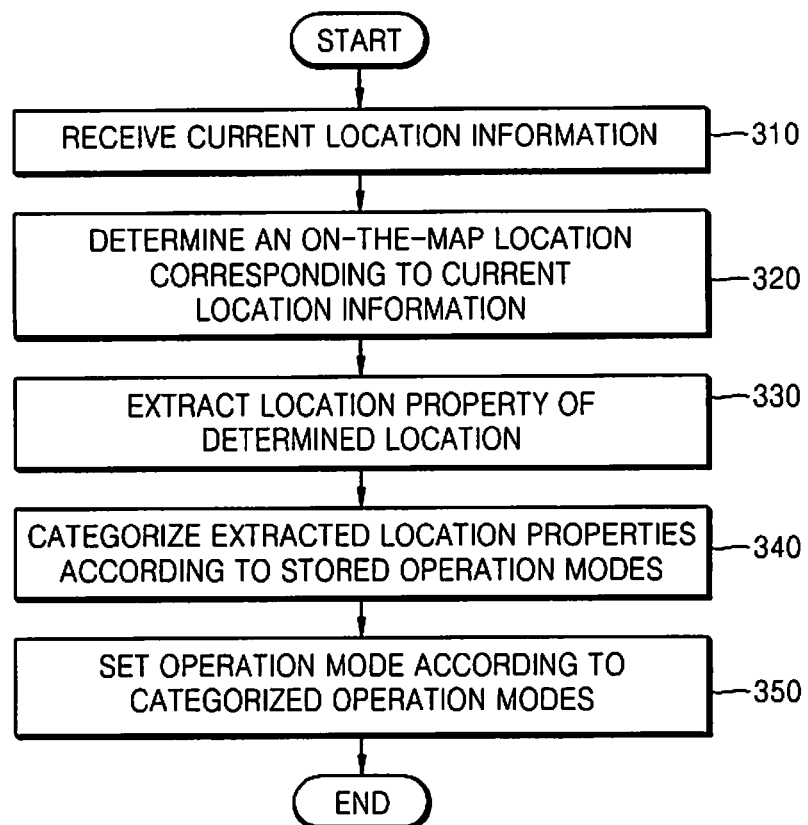
FIG. 3 is a flowchart illustrating a method of switching operation modes according to an embodiment of the present invention.

FIG. 3 is a flowchart illustrating a method of switching operation modes according to an embodiment of the present invention.

Referring to FIG. 3, in step 310, a mode switching device receives current location information from an external source. The current location information may be location information acquired by receiving, from a satellite, a Global Positioning System (GPS) signal used for determining a current location of the mode switching device. A GPS signal may includes coordinate information, such as longitude and latitude. For example, coordinate information may be longitude-latitude information indicating a location using east longitude and north latitude, such as E127:00:09,00 and N37:26:08,00. Furthermore, current location information may be received from a server providing location information via a wired or wireless communication network. Current location information received via the wired or wireless communication network may be coordinates information, such as longitude and latitude, or information for identifying a location, such as an address. The above-described method of acquiring current location information and the format of location information as stated above are merely provided as examples, and embodiments of the present invention are not limited thereto. Any of various types of information may be utilized in the present invention as long as the information informs a current location. Current location information may also be received from an associated Access Point (referred to hereinafter as an AP) or a Radio Frequency IDentifier (RFID).

In step 320, the mode switching device determines a location on a map (i.e., an "on-the-map location") corresponds to current location information. More specifically, the mode switching device matches received current location information to a map and determines an on-the-map location corresponding to a current location. Herein, the term "map" generally refers to a digital map, which is composed of digital data. A digital map includes location information, such as latitudes, longitudes, and addresses, and names of corresponding buildings and roads. Names of places are mapped and displayed with respect to each of location information. Location information of a digital map may be coded. A mode switching device according to an embodiment of the present invention may determine and display an on-the-map location corresponding to received current location information as a current location. A map may be stored in the mode switching device in advance. Furthermore, a map may also be received from an external source, and the map may be updated.

In step 330, the mode switching device extracts a location property of a determined location. Herein, the term "location property" refers to a name representing a property of the place in the name of place in the map corresponding to the determined location. A name of a place is generally combination of a proper name and a general name. For example, in names of places including "Somang Church", "Onnuri Church", and "Soonbokeum Church", "Somang", "Onnuri", and "Soonbokeum" are proper names, whereas "Church", which is a name representing the property of the places, is a general name. Furthermore, in names of places including "the National Assembly Library" and "Seoul City Library", the term "Library" is a general name. In other words, according to embodiments of the present invention, a location property refers to a general name included in a name of a place corresponding to the location. In the above-described examples, the terms "Church" and "Library" are location properties. A tolerable range for extracting a location property corresponding to a current location may be based on a distance. In other words, a location property of a current location may be extracted based on how far the current location is away from a place having the location property. For example, a location property may be extracted only if a current location is located within 10 meters from a place having the location property. The tolerable range may be set by a designer or a user of the mode switching device in advance. A distance between a current location and a place having a location property may be calculated based on coordinates thereof on a map. Alternatively, an actual distance between a current location and a place having a location property may be calculated by calculating an on-the-map distance between the current location and the place having the location property. For example, if the scale of a map is 1:1000 and an on-the-map distance between a current location and a place having a location property is 1 cm, the calculated actual distance is 10 meters. Furthermore, if a current location of the mode switching device is within a tolerable distance from a plurality of places having location properties of a location, a plurality of location properties of the location may be extracted. For example, if a current location is located within a church in a university, "church" and "university" are extracted as location properties.

In a step 340, the mode switching device categorizes extracted location properties according to stored operation modes. In other words, the mode switching device categorizes general names extracted from names of places of a corresponding location according to stored operation modes. Herein, the term "stored operation modes" refers to modes to be switched to by changing system configuration of the mode switching device based on location properties, that is, properties of general names. For example, in places requiring silence, such as a library, a silence mode or a vibration mode is required. Therefore, if an extracted property of a location is related to a library, the operation mode of the mode switching device is switched to a silence mode or a vibration mode. The operation modes may include a bell mode, a vibration mode, a silence mode, etc. Further, the operation modes are not limited to modes related to sound information of a predetermined device, and may also refer to any of general operation modes of a device other than a normal operation mode. For example, the operation modes may include operation modes for turning on or off or adjusting brightness of a display unit of the device, adjusting volumes or magnitude of a bell or vibration, changing background images, etc.

A plurality of operation modes may be combined with respect to a single property or location. For example, an operation mode for changing a background image may be combined with an operation mode for adjusting brightness of a display unit. Operation modes are pre-stored in a mode switching device, and may be changed by a user. More specifically, an operation mode may automatically switch at places corresponding to a same property according to location properties, while not switching at a place located at particular coordinates designated by a user. For example, according to an embodiment of the present invention, if a church is set as a location property, an operation mode automatically switches at any church. If a plurality of location properties is extracted with respect to a current location and an operation mode switches according to each of the plurality of location properties, conflicts may occur. Therefore, according to an embodiment of the present invention, a priority is given to each of location properties to prevent the conflicts. Therefore, if a plurality of location properties is extracted from a location, a mode switching device is automatically switched to an operation mode having the highest priority. If a plurality of operation modes having a same priority, a user interface for selecting one of the competing operation modes is provided.

In a step 350, the mode switching device sets the operation mode according to the categorized operation modes.

Figure 4:
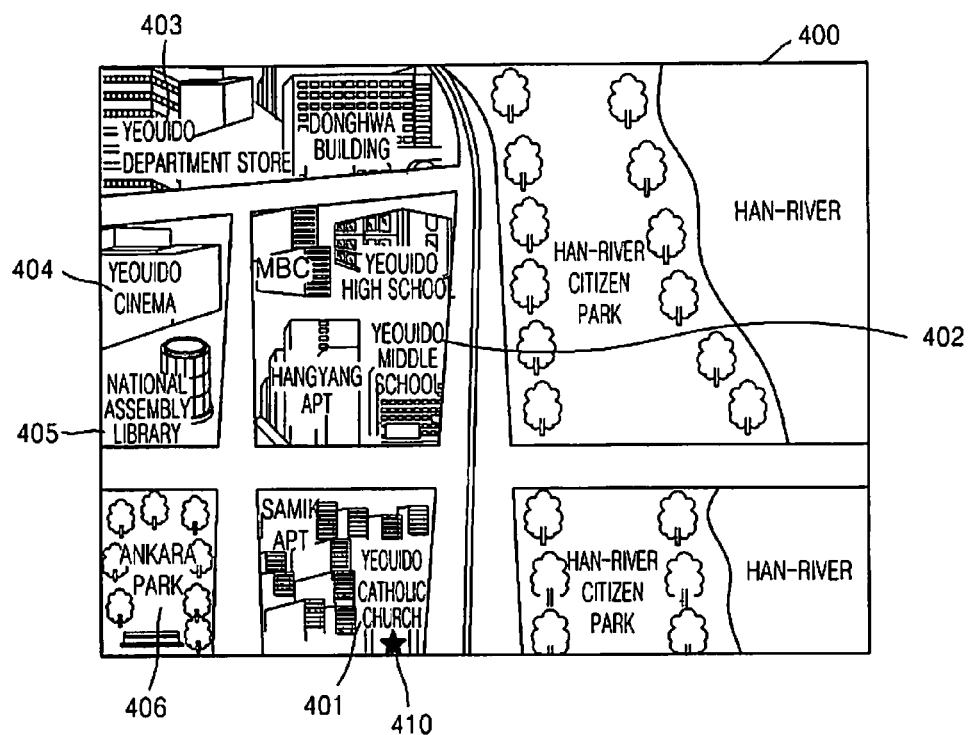
FIG. 4 is a diagram illustrating a map according to an embodiment of the present invention.

The method of FIG. 3 is further described as follows with reference to FIGS. 4 and 5. FIG. 4 is a diagram illustrating a map according to an embodiment of the present invention, and FIG. 5 is a table illustrating categorization of operation modes according to an embodiment of the present invention.

Referring to FIG. 4, received current location information is location information corresponding to the Yeouido Catholic Church 401. The Yeouido Catholic Church 401 is determined as an on-the-map location corresponding to the current location information. A symbol corresponding to a current location 410 is also indicated at the Yeouido Catholic Church 401. As described hereinabove, since a "location property" of a current location refers to a general name included in a name of a place, "Church" is the location property of the current location. Referring to FIG. 5, an operation mode corresponding to a church is an OFF mode, and thus a mobile device is automatically turned off.

As an alternative to the scenario illustrated in FIG. 4, when the current location 410 corresponds to the Yeouido Middle School 402, the location property becomes "school." Referring to FIG. 5, the corresponding operation mode is a vibration mode, and thus the mobile device is automatically switched to a vibration mode. Similarly, when the current location 410 is the Yeouido Department Store 403, the location property becomes "department store." Since a department store has many various noises, a high volume of a bell is useful. Referring to FIG. 5, a first operation mode corresponding to a department store is a bell mode, and a second operation mode corresponding to a department store is a maximum volume mode. Therefore, the mobile device is automatically switched to a bell mode and a maximum volume mode. When the current location 410 is the Yeouido Cinema 404, the location property becomes "cinema." Referring to FIG. 5, a first operation mode corresponding to a cinema is a silence mode, and a second operation mode corresponding to a cinema is a minimum display brightness mode. Therefore, the mobile device automatically switches to a silence mode and a minimum display brightness mode. When the current location 410 is the National Assembly Library 405, the location property becomes "library." Referring to FIG. 5, an operation mode corresponding to a library is a silence mode. Therefore, the mobile device is automatically switched to a silence mode. When the current location 410 is the Ankara Park 406, the location property becomes "park." Referring to FIG. 5, a first operation mode corresponding to a park is a background change mode, and a second operation mode corresponding to a park is a maximum display brightness mode. Therefore, the mobile device is automatically switched to a background change mode and a maximum display brightness mode. A background image may be stored in the mobile device in advance.

If a current location 410 corresponds to a plurality of location properties, e.g., when the current location corresponds to both of the Yeouido Department Store 403 and the Yeouido Cinema 404, location properties of the current location become "department store" and "cinema." When there is a plurality of simultaneous location properties, the operation mode of the mobile device is automatically switched to an operation mode having the highest priority. Referring to FIG. 5, the priority of cinema is 1, whereas the priority of department store is 2. Since cinema has higher priority than department store, the operation mode of the mobile device is automatically switched to an operation mode corresponding to cinema. A first operation mode corresponding to a cinema is a silence mode, and a second operation mode corresponding to a cinema is a minimum display brightness mode. Therefore, the mobile device is automatically switched to a silence mode and a minimum display brightness mode. Furthermore, when the current location corresponds to both of the Yeouido Cinema 404 and the National Assembly Library 405, location properties of the current location become "cinema" and "library." Referring to FIG. 5, the priority of cinema is 1, whereas the priority of library is also 1, i.e., both of the location properties have the same priority. Since a plurality of operation modes having a same priority conflict with each other, a user interface for selecting an operation mode is provided to a user of the mobile device. After providing the user interface, the operation mode of the mobile device is switched to an operation mode selected by the user.

FIG. 6 is a flowchart illustrating a method of switching operation modes according to another embodiment of the present invention.

Referring to FIG. 6, in step 610, a mode switching device receives current location information from an outside source. The current location information is received from a server providing location information via a wired or wireless communication network. The current location information includes names of buildings and roads corresponding to each of location information corresponding to a particular location, i.e., information related to names of places.

In step 620, location properties included in the current location information are extracted. Steps 630 and 640 are similar to the steps 340 and 350 as shown in FIG. 3, and thus detailed descriptions thereof are omitted for clarity and conciseness.

FIG. 7 is a flowchart illustrating a method of switching operation modes according to another embodiment of the present invention.

In a step S710, a mode switching device receives a place property from at least one nearby external device. the term "place property" refers to a name representing a property of the place in the name of place. The place property may include the location property. Alternatively, the place property may be a proper name relating to a place such "Starbucks." Alternatively, the mode switching device receives the name of the place, and extracts the property of the place from the name of place. According to an embodiment of the present invention, the external device may be an AP. The mode switching device receives a place property from an AP via a Route Advertising (RA) message. If that terminal includes the mode switching device is relocated from a recognition range of a first AP to a recognition range of a second AP, a handover is performed. If a signal intensity between the terminal and a first AP drops below a preset critical value, a MAC Layer handover or Link Layer (L2) handover is performed. In the present example, the terminal detects signal weakening and makes a probe request to a second AP. After a prove request is received from the second AP in response to the probe request and the terminal is authenticated and receives a reassociation response, the terminal is associated with the second AP as a new AP. An AP periodically broadcasts RA messages. Therefore, if signal is stable, the terminal receives a RA message from the second AP. The terminal may extract a place property from the received RA message.

Figure 8:
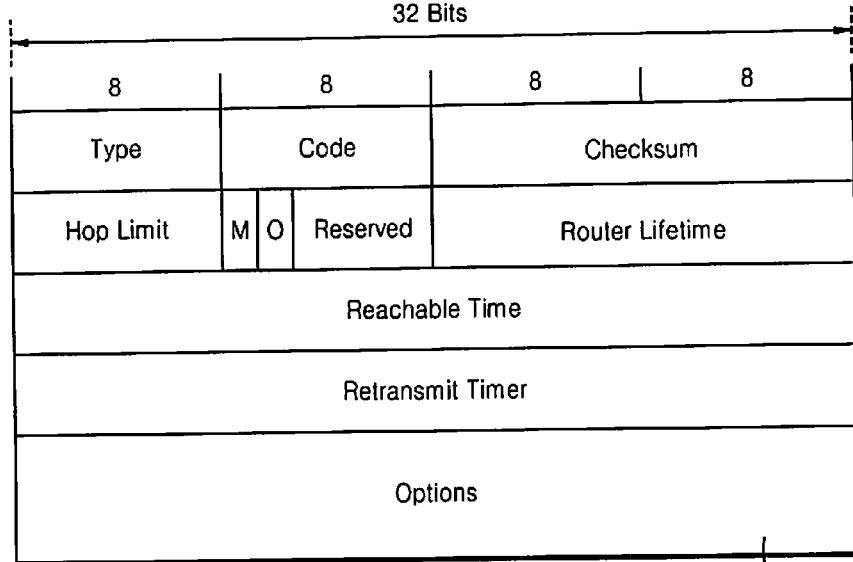
FIG. 8 is a diagram illustrating a format of an RA message, according to an embodiment of the present invention.

FIG. 8 is a diagram illustrating a format of an RA message, according to an embodiment of the present invention.

Referring to FIG. 8, an RA message includes an Options item 800, which may indicate information related to a place property. The Options item 800 may be indicated in 32 bits. In other words, the Options item 800 may indicate information having data quantity of $2^{32}$ related to a place property.

The terminal may receive information related to a place property from a particular server (e.g., a communication network carrier or a service provider) associated with the second AP. For example, as shown in FIG. 8, the terminal may recognize a place property by requesting the particular server to match bit expressions and receiving a response thereof according to information expressed as bits in the Options item 800.

Steps 720 and 730 are similar to steps 340 and 350 of FIG. 3, except that the steps 720 and 730 employ a place property instead of a location property. Therefore, a further description of steps 720 and 730 is omitted for clarity and conciseness.

Figure 9:
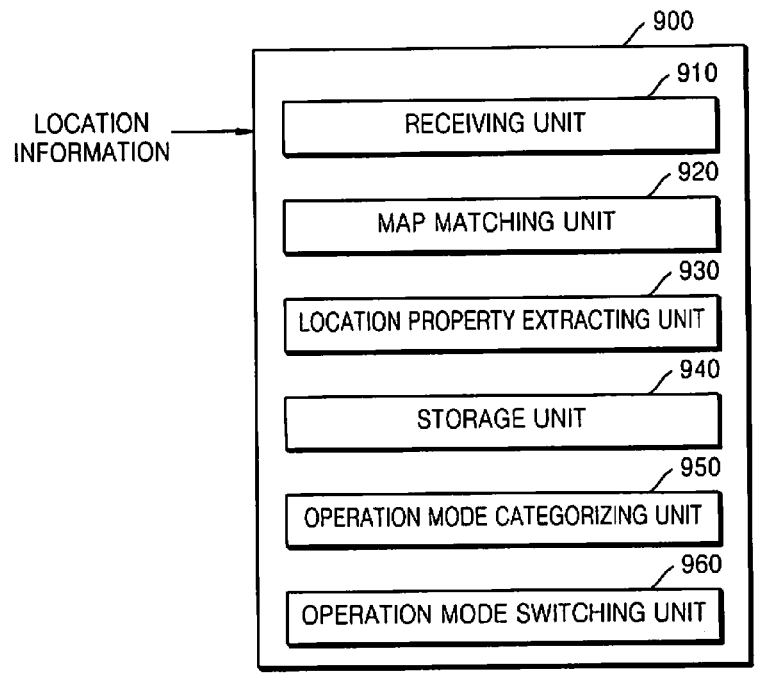
FIG. 9 is a block diagram illustrating a mode switching device according to an embodiment of the present invention.

FIG. 9 is a block diagram of a mode switching device 900 according to an embodiment of the present invention.

Referring to FIG. 9, the mode switching device 900 includes a receiving unit 910, a map matching unit 920, a location property extracting unit 930, a storage unit 940, an operation mode categorizing unit 950, and an operation mode switching unit 960.

The receiving unit 910 receives current location information from an external source. The current location information may be location information acquired by receiving a GPS signal from a satellite. A GPS signal includes coordinate information, such as longitude and latitude. For example, coordinate information may be longitude-latitude information indicating a location using east longitude and north latitude, such as E127:00:09,00 and N37:26:08,00. Furthermore, the receiving unit 910 may receive current location information from a server providing location information via a wired or wireless communication network. Current location information received via a wired or wireless communication network may be coordinate information, such as longitude and latitude, or information for identifying a location, such as an address. The above-described methods of acquiring current location information and the format of location information are merely provided as examples, and the present invention is not limited thereto. Any of various types of information may be utilized in the present invention as long as the information informs a current location. The receiving unit 910 may receive current location information from an associated AP or an RFID.

The map matching unit 920 determines an on-the-map location corresponding to current location information. A display unit (not shown) of the mode switching device 900 may display an on-the-map location corresponding to received current location information as a current location.

The location property extracting unit 930 extracts a location property of a determined location. A tolerable range for extracting a location property corresponding to a current location may be based on a distance. In other words, a location property of a current location may be extracted based on how far the current location is away from a place having the location property. For example, the location property extracting unit 930 may extract a location property only if a current location is located within 10 meters from a place having the location property. The tolerable range may be set by a designer or a user of the mode switching device 900 in advance. A distance between a current location and a place having a location property may be calculated based on coordinates thereof on a map. Alternatively, an actual distance between a current location and a place having a location property may be calculated by calculating an on-the-map distance between the current location and the place having the location property. Furthermore, if a current location is within a tolerable distance from a plurality of places having location properties of a location, the location property extracting unit 930 may extract a plurality of location properties.

The storage unit 940 stores a map and data related to categorization of operation modes. The operation mode categorizing unit 950 categorizes extracted location properties according to stored operation modes. More specifically, the operation mode categorizing unit 950 categorizes general names extracted from names of places of a corresponding location according to stored operation modes.

Operation modes are pre-stored in the storage unit 940 by the manufacturer of the mode switching device 900, and may be switched by a user. An operation mode automatically switches at places corresponding to a same property according to location properties. Further, operation modes may be configured to remain unchanged at a place located at a particular coordinates designated by a user. If the location property extracting unit 930 extracts a plurality of location properties with respect to a current location and an operation mode is switched according to each of the plurality of location properties, conflicts may occur. Therefore, according to an embodiment of the present invention, a priority is given to each of location properties to prevent the conflicts. Therefore, if a plurality of location properties is extracted from a location, the operation mode categorizing unit 950 selects an operation mode having the highest priority. If a plurality of operation modes having a same priority, the operation mode categorizing unit 950 provides a user interface for selecting one of the competing operation modes to a user.

The operation mode switching unit 960 switches an operation mode based on the categorized operation modes.

An alternative mode switching device 900-1 according to another embodiment of the present invention (not shown) is described as follows.

The mode switching device 900-1 includes a receiving unit 910-1, a map matching unit 920-1, a location property extracting unit 930-1, a storage unit 940-1, an operation mode categorizing unit 950-1, and an operation mode switching unit 960-1. In other words, the map matching unit 920 is not included in the alternative mode switching device 9001-1, in contrast to the mode switching device 900 described hereinabove with reference to FIG. 9.

The receiving unit 910-1 receives current location information from an outside source. The current location information is received from a server providing location information via a wired or wireless communication network. The current location information includes names of buildings and roads corresponding to each of location information, that is, information related to names of places. In contrast to the mode switching device 900, the location information of the mobile switching device 900-1 includes location properties.

Unlike the storage unit 940, the storage unit 940-1 only stores data related to categorization of operation modes.

Operations of the location property extracting unit 930-1, the operation mode categorizing unit 950-1, and the operation mode switching unit 960-1 are similar to those of the corresponding components of the mode switching device 900, and therefore detailed descriptions thereof will be omitted for clarity and conciseness.

The mode switching device 900-2 according to yet another embodiment of the present invention (not shown) is described as follows.

The mode switching device 900-2 includes a receiving unit 910-2, a location property extracting unit 930-2, a storage unit 940-2, an operation mode categorizing unit 950-2, and the operation mode switching unit 960-2. The location property extracting unit 930-2 may be replaced with a place property extracting unit 930-2. The map matching unit 920 is omitted in the mode switching device 900-2 according to the present embodiment as compared to the mode switching device 900 described hereinabove.

The receiving unit 910-2 receives a location property from at least one nearby external device. Alternatively, the mode switching device 900-2 receives the name of the place, and extracts the property of the place from the name of place. According to an alternative embodiment of the present invention, the external device may be an AP. The receiving unit 910-2 receives a place property from an AP via a RA message. If a terminal including the mode switching device 900-2 is relocated from a recognition range of a first AP to a recognition range of a second AP, a handover is performed. If a signal intensity between the terminal and a first AP drops below a preset critical value, an L2 handover is performed. In this case, the terminal detects signal weakening and makes a probe request to a second AP. After a prove request is received from the second AP in response to the probe request and the terminal is authenticated and receives a reassociation response, the terminal is associated with a new AP, that is, the second AP. An AP periodically broadcasts RA messages. Therefore, if signal is stable, the terminal receives an RA message from the second AP.

The place property extracting unit 930-2 may extract a place property from the received RA message. Referring to FIG. 8, a RA message includes an Options item 800, which may indicate information related to a place property.

The receiving unit 910-2 may receive information related to a place property from a particular server (e.g., a communication network carrier or a service provider) associated with the second AP. For example, as shown in FIG. 8, the mode switching device 900-2 may recognize a place property by requesting the particular server to match bit expressions and receiving a response thereof according to information expressed as bits in the Options item 800.

Unlike the storage unit 940, the storage unit 940-2 only stores data related to categorization of operation modes.

Operations of the operation mode categorizing unit 950-2 and the operation mode switching unit 960-2 are similar to operations of the operation mode categorizing unit 950 and the operation mode switching unit 960, respectively, except that a place property is employed in the present embodiment instead of a location property. Accordingly, a detailed description of the operation mode categorizing unit 950-2 and the operation mode switching unit 960-2 is omitted for clarity and conciseness.

The present invention can be embodied as computer readable codes on a computer readable recording medium. A computer readable recording medium is any data storage device that can store data that can be thereafter read by a computer system. Examples of the computer readable recording medium include Read-Only Memory (ROM), Random-Access Memory (RAM), Compact Disc (CD)-ROMs, magnetic tapes, floppy disks, optical data storage devices, etc. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While this invention has been particularly shown and described with reference to preferred embodiments thereof, it will be understood by those skilled in the art that various changes in form and details may be made therein without departing from the spirit and scope of the invention as defined by the appended claims. The described embodiments should be considered in descriptive sense only and not for purposes of limitation. Therefore, the scope of the invention is defined not by the detailed description of the invention but by the appended claims, and all differences within the scope are to be construed as being included in the present invention.

What is claimed is:

1. A method of switching operation modes, the method comprising:
 receiving current location information;
 determining an on-the-map location corresponding to the current location information;

extracting a location property of the determined on-the-map location from a name of a place in a map corresponding to the determined on-the-map location, wherein the name of the place in the map corresponding to the determined on-the-map location is parsed to extract the location property of the determined on-the-map location; and setting an operation mode of the mobile device based on the extracted location property.

2. The method of claim 1, wherein the location property is a name, which is included within the name of the place in the map corresponding to the determined on-the-map location, that represents a property of the place.

3. The method of claim 1, wherein receiving the current location information includes receiving a Global Positioning System (GPS) signal corresponding to a current location.

4. The method of claim 1, wherein receiving the current location information includes receiving the current location information via a predetermined wired or wireless communication network.

5. The method of claim 1, wherein receiving the current location information includes receiving current location information from an associated Access Point (AP).

6. The method of claim 1, wherein receiving the current location information includes receiving current location information from a Radio Frequency IDentifier (RFID).

7. The method of claim 1, wherein setting the operation mode comprises:
categorizing the extracted location property according to pre-stored operation modes; and
setting the operation mode according to the categorized operation mode.

8. The method of claim 7, wherein categorizing the extracted location property according to the pre-stored operation modes includes, if a plurality of location properties are extracted, categorizing the extracted location properties with respect to a single operation mode according to a predetermined priority.

9. The method of claim 7, wherein setting the operation mode according to the categorized location property includes, if a plurality of location properties are extracted, setting a plurality of operation modes according to a combination of a plurality of the categorized location properties.

10. A method of switching operation modes, the method comprising:
receiving current location information including a location property of a current location;
extracting a location property of a determined on-the-map location from the current location information, wherein a name of a place, which is included in the current location information, corresponding to the determined on-the-map location is parsed to extract the location property of the determined on-the-map location; and
setting an operation mode of the mobile device based on the extracted location property.

11. The method of claim 10, wherein setting the operation mode comprises:
categorizing the extracted location property according to pre-stored operation modes; and
setting the operation mode according to the categorized location property.

12. The method of claim 10, wherein the location property is a name, which is included within the name of the place in the map corresponding to the determined on-the-map location, that represents a property of the place.

13. A method of switching operation modes in a mobile device, the method comprising:

receiving a name of a place, from at least one nearby external device;
extracting a place property of the place from the name of the place, wherein the place property is a generic name of the name of the place, and the name of the place is parsed to extract the place property of the place; and
setting an operation mode of the mobile device based on the extracted place property.

14. The method of claim 13, wherein setting the operation mode comprises:
categorizing the place property according to pre-stored operation modes; and
setting the operation mode according to the categorized operation mode.

15. The method of claim 13, wherein the external device is an Access Point (AP).

16. The method of claim 15, wherein extracting the place property of the place comprises receiving the place property from a predetermined server associated with the at least one nearby external device.

17. A mode switching device comprising:
a receiving unit for receiving current location information;
a map matching unit for determining an on-the-map location corresponding to the current location information;
a location property extracting unit for extracting a location property of the determined on-the-map location, from a name of a place in a map corresponding to the determined on-the-map location, wherein the name of the place in the map corresponding to the determined on-the-map location is parsed to extract the location property of the determined on-the-map location; and
an operation mode switching unit for setting an operation mode based on the extracted location property.

18. The mode switching device of claim 17, wherein the location property is a name, which is included within the name of the place in the map corresponding to the determined on-the-map location, that represents a property of the place.

19. The mode switching device of claim 17, wherein receiving the current location information includes receiving a Global Positioning System (GPS) signal corresponding to the current location.

20. The mode switching device of claim 17, wherein receiving current location information includes receiving the current location information via a predetermined wired or wireless communication network.

21. The mode switching device of claim 17, wherein the receiving unit receives the current location information from an associated Access Point (AP).

22. The mode switching device of claim 17, wherein the receiving unit receives the current location information from a Radio Frequency IDentifier (RFID).

23. The mode switching device of claim 17, further comprising:
a storage unit for storing operation modes to be set according to the predetermined location property; and
an operation mode categorizing unit for categorizing the extracted location property according to pre-stored operation modes,
wherein the operation mode switching unit sets operation modes according to the categorized operation mode.

24. The mode switching device of claim 23, wherein, if a plurality of location properties are extracted, the operation mode categorizing unit categorizes the extracted location properties with respect to a single operation mode according to a predetermined priority.

25. The mode switching device of claim 23, wherein, if a plurality of location properties are extracted, the operation mode switching unit sets a plurality of operation modes according to a combination of a plurality of the categorized location properties.

26. A mode switching device comprising:
   a receiving unit for receiving location information including a location property of a current location;
   a location property extracting unit for extracting a location property of a determined on-the-map location from the location information, wherein a name of a place, which is included in the location information, corresponding to the determined on-the-map location is parsed to extract the location property of the determined on-the-map location; and
   an operation mode switching unit for setting an operation mode based on the extracted location property.

27. The mode switching device of claim 26, further comprising:
   a storage unit for storing operation modes to be switched according to the extracted location property; and
   an operation mode categorizing unit for categorizing the extracted location property according to pre-stored operation modes,
   wherein the operation mode switching unit sets the operation mode according to the categorized location property.

28. The mode switching device of claim 26, wherein the location property is a name, which is included within the name of the place in the map corresponding to the determined on-the-map location, that represents a property of the place.

29. A mode switching device comprising:
   a receiving unit for receiving a name of a place, from at least one nearby external device;
   a place property extracting unit for extracting a place property of the place from the name of the place, wherein the place property is a generic name of the name of the place, and the name of the place is parsed to extract the place property of the place; and
   an operation mode switching unit for setting an operation mode based on the extracted place property.

30. The mode switching device of claim 29, wherein the external device is an Access Point (AP).

31. The method of claim 30, wherein the receiving unit receives a place property from a predetermined server associated with the at least one nearby AP.

32. The mode switching device of claim 29, wherein the operation mode switching unit categorizes the place property according to pre-stored operation modes and sets the operation mode according to the categorized operation mode.

33. A non-transitory computer readable recording medium having recorded thereon a method of switching operation modes, the method comprising:
   receiving current location information;
   determining an on-the-map location corresponding to the current location information;
   extracting a location property of the determined on-the-map location from a name of a place in a map corresponding to the determined on-the-map location, wherein the name of the place in the map corresponding to the determined on-the-map location is parsed to extract the location property of the determined on-the-map location; and
   setting an operation mode based on the extracted location property.

34. A non-transitory computer readable recording medium having recorded thereon a method of switching operation modes, the method comprising:
   receiving current location information including a location property of a current location;
   extracting a location property of a determined on-the-map location from the current location information, wherein a name of a place, which is included in the current location information, corresponding to the determined on-the-map location is parsed to extract the location property of the determined on-the-map location; and
   setting an operation mode based on the extracted location property.

35. A non-transitory computer readable recording medium having recorded thereon a method of switching operation modes, the method comprising:
   receiving a name of a place, from at least one nearby external device;
   extracting a place property of the place from the name of the place, wherein the place property is a generic name of the name of the place, and the name of the place is parsed to extract the place property of the place; and
   setting an operation mode based on the received extracted place property.

* * * * *